United States Patent [19]

Lanter

[11] Patent Number: 5,217,740
[45] Date of Patent: Jun. 8, 1993

[54] HIGH MOISTURE RATION

[75] Inventor: Kent J. Lanter, Millstadt, Ill.

[73] Assignee: Purina Mills, Inc., St. Louis, Mo.

[21] Appl. No.: 744,387

[22] Filed: Aug. 13, 1991

[51] Int. Cl.$^5$ ................................................. A23K 1/00
[52] U.S. Cl. .................................... 426/573; 426/335; 426/392; 426/520; 426/532; 426/623; 426/630; 426/658; 426/805
[58] Field of Search ............... 426/573, 805, 807, 623, 426/630, 512, 520, 335, 532, 392, 658

[56] References Cited

U.S. PATENT DOCUMENTS

| | | | |
|---|---|---|---|
| 3,635,723 | 1/1972 | Shelton et al. | 426/2 |
| 4,089,979 | 5/1978 | Jackson | 426/573 |
| 4,143,171 | 3/1979 | Buckley et al. | 426/573 |
| 4,158,706 | 6/1979 | Ernst et al. | 426/573 |
| 4,988,531 | 1/1991 | Moore et al. | 426/573 |
| 5,089,277 | 2/1992 | Prochnow | 426/573 |

*Primary Examiner*—R. B. Penland
*Attorney, Agent, or Firm*—Edward H. Renner

[57] ABSTRACT

A process for preparing a complete ration for confined animals is disclosed. The ration is in solid form and supplies the animals water requirements and nutritional requirements. The ration is prepared by adding an edible gum to water, heating the combined water and edible gum to a temperature effective to solubilize the edible gum, combining the water and gum with a basal feed composition containing the animals nutritional requirement and with a carbohydrate, maintaining the combined materials at a temperature below the gelatinizing temperature of the carbohydrate, dispensing the heated combination into portions and cooling the dispensed portions to form a water containing gelled solid food article.

10 Claims, No Drawings

5,217,740

HIGH MOISTURE RATION

BACKGROUND OF THE INVENTION

This invention pertains to feeds for confined animals.

In transporting and shipping small animals such as pets, that is, dogs and cats, as well as white mice, gerbils, white rats, guinea pigs, rabbits, monkeys, ferrets, chinchillas, and even poultry, it is usually necessary to provide them with water and sufficient nutrition. Water spillage renders the practice quite undesirable. Feeding the animals without water, and leaving them thirsty is as objectionable as not feeding them in the first place; yet no workable watering system has been devised for shipping small animals.

In addition to transporting animals, modern research is demanding that an increasing number of laboratory animals be reared in isolated environments. In many of those laboratories the provisions for care of animals are such that monitoring feed and water presents a problem. In both instances it would be desirable to have a laboratory animal feed which contained the animal's daily supply of water. By "confined animals," then, we mean animals being transported or shipped from one place to another, as well as laboratory animals.

The most desirable means for feeding confined animals is to employ animal feeds which contain the animal's entire requirement of water, such feeds are described in U.S. Pat. No. 3,635,723. The shipping diet disclosed in this patent, which is incorporated herein by reference, is in the form of gelled compositions containing both the feed and the water. The gels are such that they not only satisfy the nutritional requirements of the animals, but that they contain enough water to meet optimum water requirements.

The preparation of these water-containing feeds, as pointed out in U.S. Pat. No. 3,635,723 involves mixing the water and dry materials and introducing them into pouches. The pouches are then sealed, placed in a retort and heated at a temperature of about 250° F. When removed from the retorting process the material is in the form of a stable gel.

Because of the retort requirement this process has been found to be too expensive and demanding for use in the production of shipping diets for axenic animals, and particularly, for ordinary laboratory animal shipping diets, that is, feeds for non-isolated animals. This is especially true since during the retorting process nine to ten pounds of superimposed air pressure must be maintained to prevent rupturing the pouches by the internal steam generated. Another disadvantage of the shipping diet of U.S. Pat. No. 3,635,723 is that when removed from the retorting process the material is in the form of a stable gel. Hence at gel forming temperatures the material is not fluid long enough for packaging in any other form. However, no low temperature process is known for the production of solid laboratory animal feed containing the animal's daily supply of water. Herein such a feed is provided.

SUMMARY OF THE INVENTION

The confined animal feed provided herein is not intended as a maintenance diet, but is an outstanding gum based diet for short term feeding. Gums are a class of high molecular weight molecules, usually with colloidal properties, which in appropriate solvents are able to produce gels. Gums are characterized by the sugars present in them and by their plant and animal origins. It has now been found that in combination with nutrient materials, a small quantity of a solubilized gum forms a gel which will not solidify immediately. Yet the combination will occlude up to 65 to 80 weight percent water based on the total feed to form a shipping diet in solid form for laboratory animals. A solid animal feed is thus provided containing an amount of water such that a daily ration of feed contains the animal's daily water requirement. The feed is also subject to syneresis than the feed of U.S. Pat. No. 3,635,723.

DETAILED DESCRIPTION OF THE INVENTION

Typical shipping diets contain wheat or wheat and corn byproducts such as middlings or flour. When converted to gels using molasses, with or without alginates, such feeds are prone to syneresis. In addition, when wheat-based feeds are employed in combination with alginates, gelation tends to reach completion before the finished feed product can be made. Moreover, such compositions are so viscous even prior to gelation that they are difficult to handle in conventional production equipment. However, when certain gums are heated in water they do not gel immediately, even when combined with nutrient material. At temperatures sufficient to dissolve the gum, say up to 180° F., they form a colloidal solution. Workable liquids result which afford a sufficiently long working or production handling period prior to complete gelation. This is not true of prior art water-containing shipping diets. Moreover, the final gel is nevertheless a solid showing no evidence of syneresis.

The carbohydrates contemplated herein include sorgum flour, ground rice, rice flour, ground extruded corn ground sorgum, dextrin and sucrose. By gums, as indicated hereinbefore, we mean those well known viscous plant and animal secretions, hardening to form resin-like compositions. Unlike resins, however, these compounds are water soluble. Examples of gums of plant origin are agar, algin and carrageenan derived from seaweeds, plant exudates such as gum arabic, ghatti and tragacanth, plant extracts such as pectin, plant seeds such as guar, locust bean, and animal exudates such as chitin and gelatin. Other gums include amylose and amylopectin and gums of bacterial origin. To form the gel feed, only 0.25 to 1.5 weight percent based on the feed composition is necessary.

Of course more can be used if desired. And it will be appreciated that since all gums may not give the same result in all feed formulations some judgment will be required. Further, some consideration must be given the selection of preservatives. If acidic preservatives such as fumaric or propionic acid and calcium salts are present, algin should be avoided. Gelation, in the case of algin, is more rapid in the presence of soluble calcium salts and in an acidic environment. In addition at high levels of such acids as fumaric the resulting gel may exhibit syneresis. Thus the selection of the gum may depend upon the preservative system and the feed formulation.

It will be understood that in addition to the carbohydrate, the gum, and the water it will be desirable to add other nutrients such as proteins, vitamins and minerals.

A preferred process, which includes such additives, is set forth in Example 1.

EXAMPLE 1

| Ingredient | Percent by Weight |
| --- | --- |
| Rice Flour | 11.100 |
| Corn Carrier | 1.000 |
| Gum A | 1.000 |
| Flavor | .300 |
| Protein | 3.400 |
| Plain Salt | .100 |
| Dicalcium Phosphate | 4.300 |
| Citric Acid | 0.500 |
| Potassium Sorbate | 1.000 |
| Propionic Acid | 0.500 |
| Fumaric Acid | 1.500 |
| Vitamins & Minerals | .289 |
| Water (to balance) | 75.011 |
| | 100.000 |

Gum A employed herein was a blend of carrageenan and locust bean gums available under the trademark "Colloid Cleartic". Both twenty and four hundred pound batches were made using the weight percentages listed. To the water, the Colloid Cleartic, vitamin premix and preservatives were added in a Lab Myers mixer, and the mixture was heated to 180° F. The temperature of the mix was maintained, with stirring, for three minutes to form a solution. The solution was then allowed to cool, and when the temperature dropped to 160° F. the rice flour, protein and flavoring agent were added. The protein was an isolated soy protein available as "Supro 620".

The mixture remains fluid as long as it is held at a temperature between 140° and 160° F. This extends the gelation reaction time, the period prior to the formation of a solid, beyond 30 minutes, affording a much longer period for packaging than the alginate process of the prior art. Further there was no syneresis after 30 days even though the solid feed contained 75 weight percent occluded water.

Further illustrating the invention are examples 2 and 3.

EXAMPLE 2

Following the procedure of Example 1, 400 pounds of a solid feed were produced using the following ingredients:

| Ingredient | Percent by Weight |
| --- | --- |
| Gum A | 1.0 |
| Vitamin Premix | .38 |
| Citric acid | .5 |
| Propionic acid | .5 |
| Potassium sorbate | 1.0 |
| Fumaric acid | 1.5 |
| Flavor | .3 |
| Supro 620 | 3.9 |
| Rice flour | 15.92 |
| Water (to balance) | 75.00 |
| | 100.00 |

The resulting feed had excellent properties and showed no signs of syneresis after 30 days.

EXAMPLE 3

To compare holding times, the packaging period from the time when all of the ingredients are combined as the temperature drops to 160° F., three periods (A, B and C) were compared. The composition of the feed was as follows:

| Ingredient | Weight Percent A | B | C |
| --- | --- | --- | --- |
| Water (to balance) | 68 | 65 | 65 |
| Colloid Cleartic | 1.0 | 1.0 | 1.0 |
| Vitamin premix | .38 | .38 | .38 |
| heat to 180°, hold three min. | | | |
| Water | 7 | 10 | 10 |
| Citric acid | .5 | .5 | .5 |
| Propionic acid | .5 | .5 | .5 |
| Fumaric acid | 1.5 | 1.5 | 1.5 |
| Potassium sobate | 1.0 | 1.0 | 1.0 |
| Cool to °F. | 160 | 157 | 155 |
| Add: | | | |
| Supro 620 | 3.9 | 3.9 | 3.9 |
| Rice flour | 15.9 | 15.9 | 15.9 |
| Holding temperature | — | 150-155 | 147-153 |
| Holding time (min.) | 0 | 47 | 15 |
| Product quality | excellent | excellent | excellent |

As can be seen the product was unaffected by holding time. An excellent product was produced whether the period was 0 or 47 minutes. Hence, the product is much easier to package. These advantages are further exemplified by the following shipping diets.

EXAMPLE 4

By the procedure of Example 1, and using the formulation which follows, water and gum were heated to 180° F. and held for three minutes. All ingredients except rice flour, sucrose or dextrin were then added. Product was cooled to 165° F. Either rice flour, sucrose or dextrin was then added and the product was poured into 16 oz trays and sealed.

| Ingredient | Percent by Weight |
| --- | --- |
| Gum A | 1.0 |
| Fumaric acid | 1.5 |
| Potassium sorbate | 1.0 |
| Citric acid | .5 |
| Propionic acid | .5 |
| Flavor | .3 |
| Dicalcium phosphate | .8 |
| Supro 620 | 3.6 |
| Rice flour or sucrose or dextrin | 15.3 |
| Vitamin premix | .5 |
| Water (to balance) | 75.0 |
| | 100.0 |

As shown in the following table the shipping diets made with sucrose and dextrin had god viscosity and gelled normally.

| | Treatment A | B | C |
| --- | --- | --- | --- |
| Rice flour | + | | |
| Sucrose | | + | |
| Dextrin | | | + |
| Gel | normal | normal | normal |
| Viscosity | good | good | good |

B & C were slightly less viscous than A. All three diets were consumed normally by rats and hence were effective shipping diets.

EXAMPLE 5

To illustrate cat and ferret diets the following is given.

| VARIABLE TABLE AND FORMULATION | | | | | |
| --- | --- | --- | --- | --- | --- |
| | Treatment | | | | |
| | A | B | C | D | E |
| Water (%) (to balance) | 75 | 75 | 75 | 67 | 67 |
| Colloid Cleartic (%) | 1 | 1 | 1 | 1 | 1 |
| Fumaric acid (%) | 1.5 | 1.5 | 1.5 | 1.5 | 1.5 |
| Potassium sorbate (%) | 1 | 1 | 1 | 1 | 1 |
| Citric acid (%) | .5 | .5 | .5 | .5 | .5 |
| Propionic acid (%) | .5 | .5 | .5 | .5 | .5 |
| Strawberry flavor (%) | .3 | .3 | .3 | .3 | .3 |
| Lab Cat premix (%) | 12.3 | | 10.1 | | |
| Ferret premix (%) | | 13.9 | | | |
| Poultry fat (%) | 1.7 | 3.0 | 10.1 | 10.0 | 14.1 |
| Extruded corn (%) | 6.2 | 3.3 | | 9.0 | 4.9 |
| Sucrose (%) | | | | 5 | 5 |
| Soy isolate (Supro 620) (%) | | | | 3.4 | 3.4 |
| Precip. dicalcium phosphate (%) | | | | .8 | .8 |
| Viscosity (subjective) | good | good | thin | good | good |
| Gelation | good | good | good | good | good |

The water and colloid were heated to 180° F. for three minutes while being stirred. After being allowed to cool to 178° F. the other ingredients, except the extruded corn, were added. After cooling to 160° F. the extruded corn was added. The mixture was then poured into 16 oz. trays and sealed.

All of the compositions set to good gels, and they remained fluid for mixing until cooled.

The following composition was prepared to determine the effect of higher energy and lower water on the physical properties of a roden shipping diet.

EXAMPLE 6

| FORMULATION | |
| --- | --- |
| | Weight % |
| Colloid Cleartic | 1.0 |
| Soy oil | 5.0 |
| Sucrose | 10.0 |
| Mineral premix | .12 |
| Vitamin premix | .3975 |
| Fumaric acid | 1.5 |
| Potassium sorbate | 1.0 |
| Citric acid | .5 |
| Propionic acid | .5 |
| Strawberry flavor | .3 |
| Dicalcium phosphate | .8 |
| Supro 620 | 3.6 |
| Ground Rice | 8.23 |
| Water (to balance) | 67.0 |
| | 100.00 |

The water, colloid, vitamin premix and preservatives were heated to 180° F. On cooling to 160° F. the flavor, protein and flour were added. A temperature of 150° to 155° F. was maintained until the diet was poured into its trays. At this point the viscosity of the product was still such that it could be easily packaged.

It is to be understood that the use of a gum to produce a solid feed in gel form will not change the ingredients except the use of the colloidal carbohydrate normally used instead of others such as wheat flour or middlings. The feed will still include 5 to 15 percent protein, 5 to 25 percent carbohydrates, 0.5 to 2.5 percent fat, and 0.5 to 1.5 percent fiber. Our preferred feed contains 67 percent water.

In addition various preservatives such as fumaric acid, propionic acid, and citric acid, can be included in the animal feed as well as other antibacterial and antifungal compounds which include known preservatives such as potassium sorbate, sodium sorbate, and other sorbate salts and sorbic acid. Other additives, including protein, coloring agents, flavor conferring compounds, minerals, and other trace nutrients, along with vitamin preparations, are well known in the art and available commercially.

Having been given the teachings of this invention ramifications will occur to those skilled in the art. Thus during the holding period, before the gel forms, the feed can be pumped into trays or containers sized to hold either a daily ration, or a meal. Then at each feeding it will be necessary only to remove a lid or seal and place the tray or container in the cage. This is not true of the shipping diet of U.S. Pat. No. 3,635,723. Further, using some formulations gel forming temperatures can be held at 150°-160° F. without adverse effects.

It will be appreciated by those skilled in the art that modifications may be made to the invention as disclosed, but that those modifications remain within the spirit of the invention. The invention is not to be limited to the specifics of the embodiments disclosed herein for purposes of illustration, but only by the scope of the claims appended hereto and their equivalents.

I claim:

1. A low temperature process for preparing a complete ration for confined animals, the ration being in solid form and supplying the animals water requirements, consisting essential of adding an edible gum selected from the group consisting of gum arabic, ghatti, tragacanth, guar, locust bean gum, agar, algin, carrageenan, pectin, chitin, gelatin, amylose, amylopectin and bacterial gums to water, heating the added water and edible gum to a temperature effective to solubilize the edible gum, combining the water and gum with a basal feed composition containing the animals nutritional requirement and with a carbohydrate selected from the group consisting of ground rice, rice flour, ground extruded corn, ground sorghum, sorghum flour, dextrin and sucrose, maintaining the combined materials at a temperature below the gelatinizing temperature of the carbohydrate to maintain the combined materials in a workable liquid state, dispensing the heated workable liquid combination into portions suitable for packaging and cooling the dispensed portions to form a water containing gelled solid food article, the food article containing the complete nutritional and water requirements for confined animals.

2. The method of claim 1 wherein the ration contains an edible preservative selected from the group consisting of fumaric acid, propionic acid, citric acid, sorbic acid and salts thereof.

3. The method of claim 1 wherein the food article contains between about 60 to 80% by weight water and between about 5 to 25% by weight carbohydrate.

4. The method of claim 3 wherein the food article contains between about 8 to 15% by weight carbohydrate and between about 0.5 to 1.5% by weight gum.

5. The method of claim 3 wherein the food article contains about 67% by weight water, about 8% by weight carbohydrate, about 1.5% by weight gum and about 3.5% by weight preservatives.

6. The method of claim 1 wherein the gum is first added to water and heated to about 180° F., the water and gum are then cooled to about 160° F. and the remaining ingredients are added.

7. A self-sufficient diet for confined animals containing all nutritional and water requirements in a solid form consisting essentially of a basal nutrient composition containing between about 60 to 80% water, between about 5 to 15% by weight of a carbohydrate selected from the group consisting of ground rice, rice flour, ground extruded corn, ground sorghum, sorghum flour, dextrin and sucrose, between about 0.5 to 1.5% by weight of an edible gum selected from the group consisting of gum arabic, ghatti, tragacanth, guar, locust bean gum, agar, algin, carrageenan, pectin, chitin, gelatin, amylose, amylopectin and bacterial gums and an edible preservative, the carbohydrate and edible gum being effective, in combination, to produce a water containing workable liquid suitable for packaging which becomes a gelled solid food article, the food article containing the complete nutritional and water requirements for confined animals.

8. The produce of claim 7 wherein the diet contains an edible preservative selected from the group consisting of fumaric acid, propionic acid, citric acid, sorbic acid and salts thereof.

9. The product of claim 7 wherein the food article contains between about 8 to 15% by weight carbohydrate.

10. The product of claim 7 wherein the food article contains about 67% by weight water, about 8% by weight carbohydrate, about 1.5% by weight gum and about 3.5% by weight preservatives.

* * * * *